(No Model.)
W. J. KAUFFMAN.
RUNNING GEAR FOR VEHICLES.
No. 533,816. Patented Feb. 5, 1895.
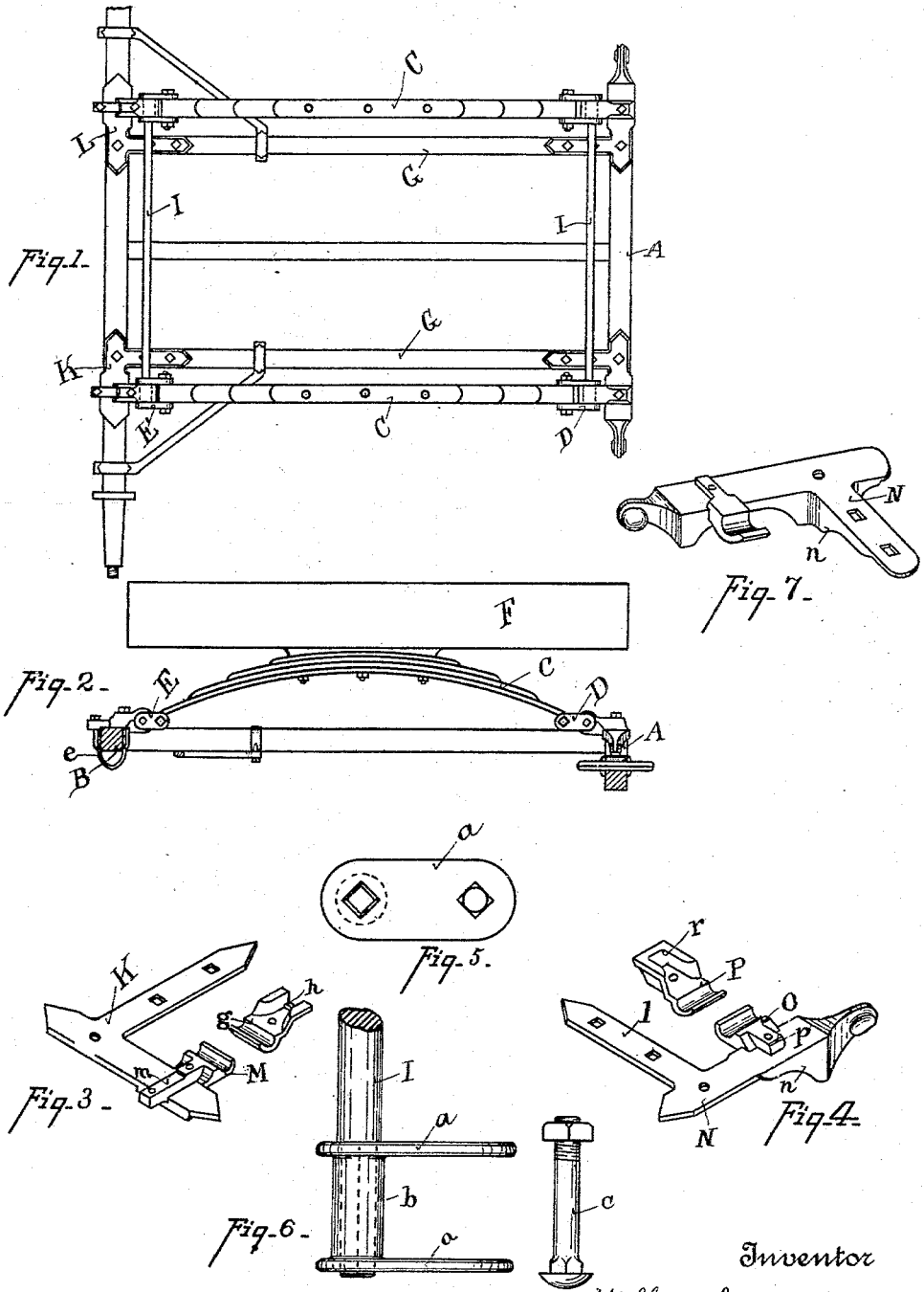

UNITED STATES PATENT OFFICE.

WILLIAM J. KAUFFMAN, OF MIAMISBURG, OHIO.

RUNNING-GEAR FOR VEHICLES.

SPECIFICATION forming part of Letters Patent No. 533,816, dated February 5, 1895.

Application filed September 10, 1894. Serial No. 522,641. (No model.)

*To all whom it may concern:*

Be it known that I, WILLIAM J. KAUFFMAN, a citizen of the United States, residing at Miamisburg, in the county of Montgomery and State of Ohio, have invented certain new and useful Improvements in Running-Gear for Vehicles, of which the following is a specification.

The object of my invention is to provide a durable shackle and shackle support for carriage springs.

The features of my invention will be more fully set forth in the description of the accompanying drawings, making a part of this specification, in which—

Figure 1, is a top plan view of the running gear of a buggy with my improvement coupled to the springs and gear. Fig. 2, is a side elevation of the invention. Fig. 3, is a detailed view of the shackle bearing attached to the rear axle. Fig. 4, is a detailed view of the shackle support attached to the head block at the front of the gear. Fig. 5, is an enlarged side elevation of the shackle. Fig. 6, is a top plan of the same. Fig. 7, is a modification of Fig. 4.

A represents the head block of the running gear; B, the axle gear; C, the side springs coupled to the head block and axle by the shackles D, E.

F represents the wagon body; G, G, the perch bars; I, I, the equalizers.

The shackles D, E, are of the same construction and are composed of link arms $a$ formed integral with the sleeve $b$.

$c$ represents the axial bolt passing through the arms of the shackle and an eye of the spring.

In order to provide a firm and durable bearing for the shackles they are constructed as follows: K, L represent knee brackets attached to the rear axle and to the perch arms. They are rights and lefts so that the journal box for the shackle may be integral therewith. M represents said journal boxes and they are provided with a rib $m$ extending back across the arm of the bracket, a sufficient distance to serve as a yoke for the clip $e$ which secures them to the axle. $g$ represents the cap of the journal the bracket end of which is provided with a recess $h$ which embraces the rib $m$, the flanges of each side of the recess seating upon the face of the bracket allowing the cap to be secured by a single bolt, which in this case is one arm of the clip $e$. N represents a bracket secured to the head block A. One arm of the bracket is provided with a socket head $n$ which engages the end of the head block and strengthens and supports the head block without the use of a bolt near the end. The arm $l$ of the bracket is bolted to the perch arms and head block. O represents the journal box formed integral with the bracket N and is provided with rib $p$ extending forward. P represents the cap of the journal box which is provided with the recess $r$ engaging the rib $p$, the flanges around the recess seating squarely on the face of the bracket. A single clamping bolt is employed to secure the cap to the journal box. I represents the equalizer rods the ends of which are made polygonal and pass through a correspondingly shaped orifice in the sleeve $b$, of the shackles. The front brackets are made rights and lefts so as to engage each end of the head blocks.

In the modification shown in Fig. 7, the bracket arm N is provided with depending flanges $n$ so as to form an open socket to receive the perch bars.

It is exceedingly desirable to employ coupling devices for hinging the springs to the running gear which are rigid and not liable to wear thereby producing lost motion and this is especially true when equalizer rods are employed.

By making the shackle arms integral with the sleeves and rigidly connecting the journal boxes to the knee brackets which are connected to the axle and head block, I have greatly improved the durability and action of the shackle and couplings.

I claim—

1. In a shackle support, the combination of a knee bracket and a journal box formed integral therewith and provided with a laterally extending rib projecting above the upper surface of the knee bracket, and a journal cap provided with a recessed extension fitting over and embracing both sides of said rib and bearing on top of the knee bracket, substantially as described.

2. In a vehicle running gear, the combination with the rear axle, of the bracket K carrying a journal box M having a rearwardly extending rib $m$ projecting above the upper surface of the bracket and serving as a yoke for the clip, the cap $g$ provided with a recessed extension fitting over said rib and bearing on top of the bracket, and a clip fitted in perforations formed in said rib and cap and embracing the axle, substantially as described.

In testimony whereof I have hereunto set my hand.

WILLIAM J. KAUFFMAN.

Witnesses:
  C. W. MILES,
  W. R. WOOD.